Patented Feb. 20, 1923.

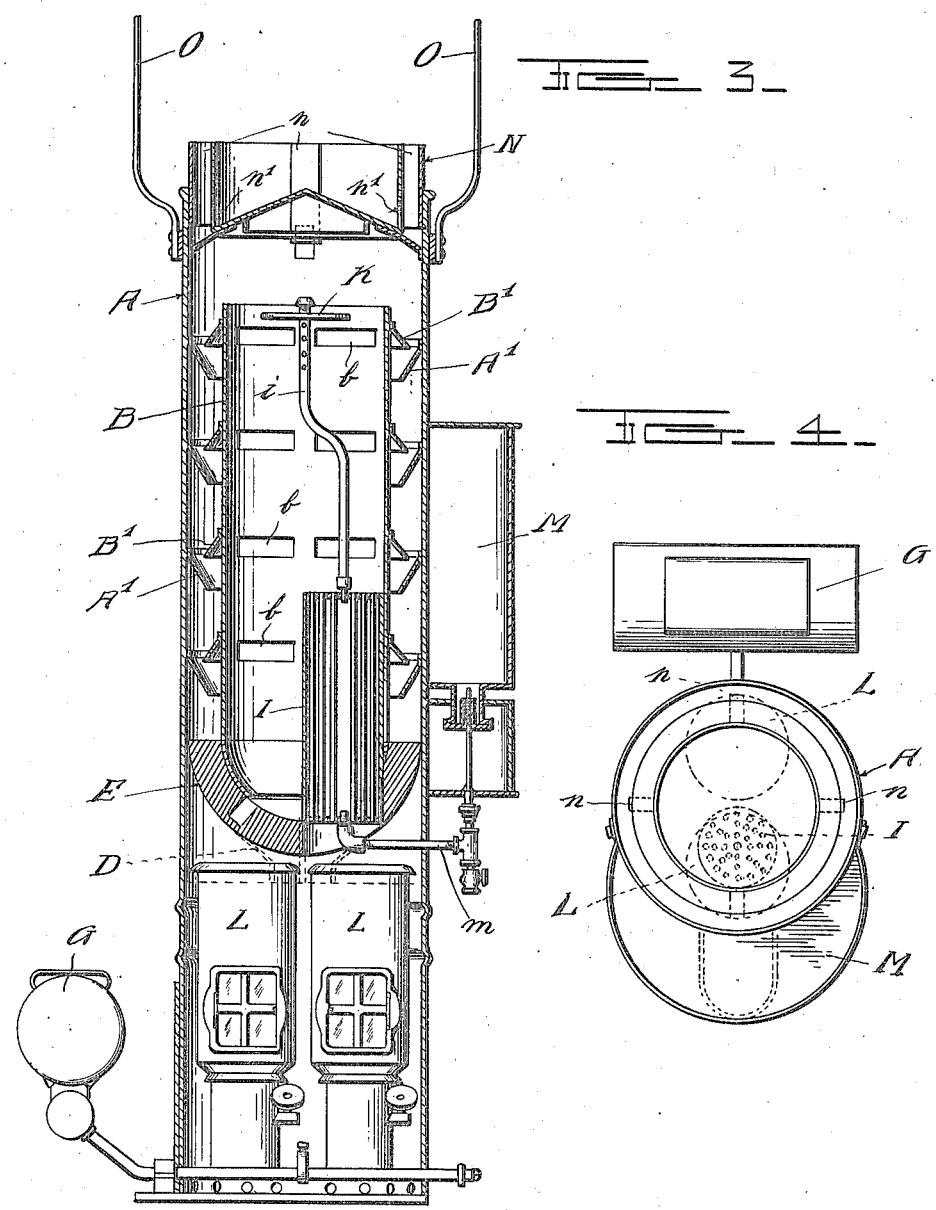

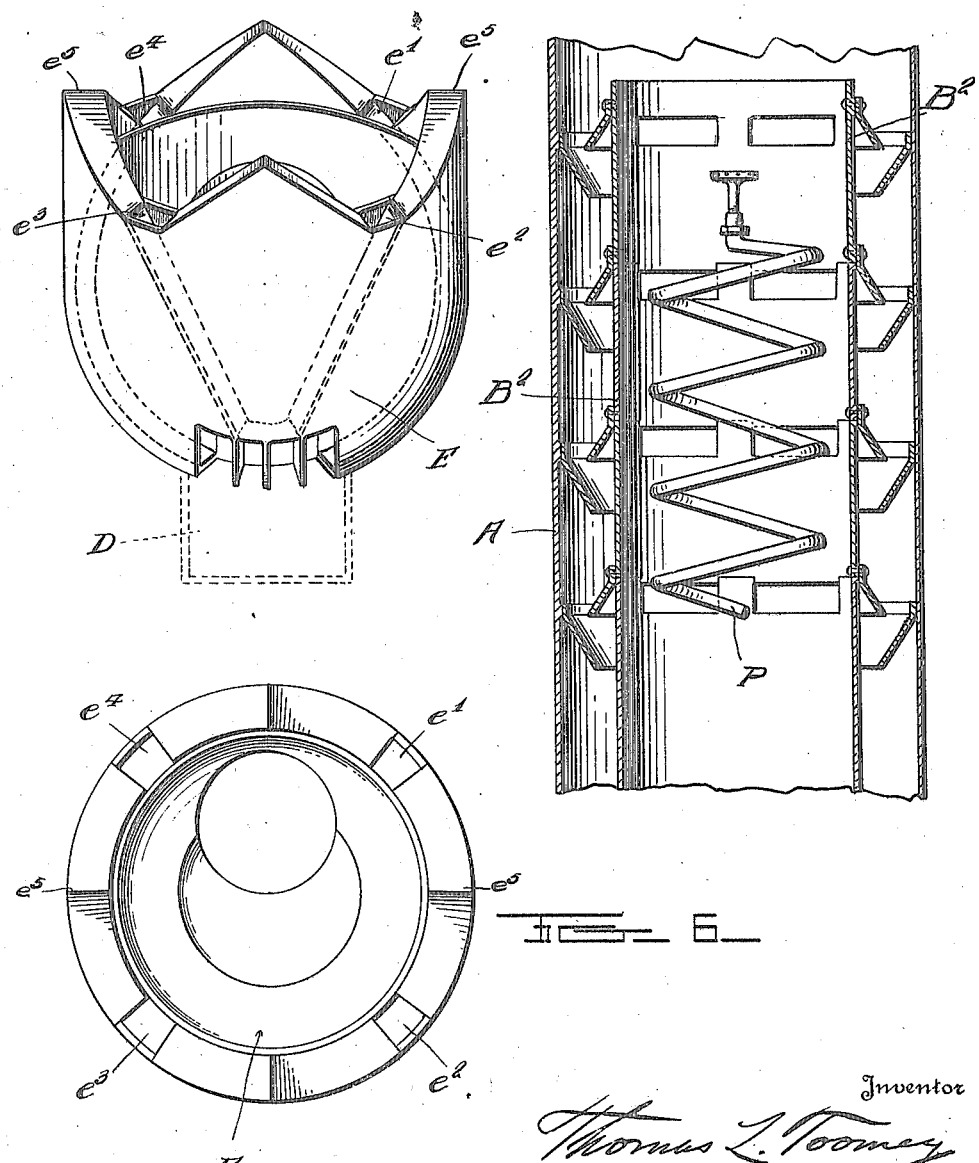

1,445,806

UNITED STATES PATENT OFFICE.

THOMAS LAWRENCE TOOMEY, OF WILA, PENNSYLVANIA.

APPARATUS FOR CONDITIONING WHEAT AND OTHER GRAIN.

Application filed December 7, 1921. Serial No. 520,582.

*To all whom it may concern:*

Be it known that I, THOMAS L. TOOMEY, a citizen of the United States, residing at Wila, in the county of Perry and State of Pennsylvania, have invented certain new and useful Improvements in Apparatus for Conditioning Wheat and other Grain; and I do hereby declare the following to be a full, clear, and exact description of the invention, such as will enable others skilled in the art to which it appertains to make and use the same.

This invention relates to apparatus for conditioning or tempering wheat or other grain previous to grinding, by subjecting the grain to the heating effect of warm or hot air, either moist or dry, as the grain passes to the grinder.

The object of the invention is to provide a simple, efficient and reliable apparatus of the character referred to whereby the grain in its passage to the grinders is subjected to the action of either moist or dry air, or steam, as occasion may require, without coming in contact with the heating medium; the apparatus being also adapted to be used for cooling meal or other product by using cold air instead of warm or hot air or steam.

The invention will first be hereinafter more particularly described, with reference to the accompanying drawings, which are to be taken as a part of this specification, and then pointed out in the claims at the end of the description.

In said drawings, Fig. 1 is a vertical longitudinal sectional elevation of a wheat conditioner embodying my invention;

Fig. 2 is a side elevation of the same, partly broken away, to show the interior construction; this view being taken at right angles to the view shown in Fig. 1;

Fig. 3 is a vertical longitudinal sectional elevation taken at right angles to the section shown in Fig. 1;

Fig. 4 is a top plan view of the apparatus;

Fig. 5 is a detail view of a semi-globular body forming the cylinder bottom and having multiple spouts or conduits adapted to effect an even or uniform discharge of the grain from the conditioner;

Fig. 6 is a plan view of said semi-globular body; and

Fig. 7 is a fragmentary view, in vertical sectional elevation, of a modification of the apparatus shown in Figs. 1 to 4.

Referring to said drawings, in which the same reference letters are used to denote corresponding parts in different views, the letter A denotes a casing which is preferably cylindrical in form and has secured therein preferably concentric therewith, a cylinder or casing B, which is separated from the outer casing a sufficient distance to provide an annular space between the two cylinders for the passage of grain thru a series of agitating devices in said space from top to bottom of the inner cylinder, the lower end of which, in the form shown, is raised above the bottom of the outer cylinder far enough to provide a heating chamber within which is placed a lamp or lamps L containing kerosene or other liquid fuel for heating the air in said chamber. Within the annular space surrounding the inner cylinder are secured, in pairs, one above another, agitating devices $A^1$ and $B^1$, which are placed a sufficient distance apart to permit the grain to pass between the two members. It first slides downwardly and outwardly from an upper to a lower member and is then caused to slide downwardly and inwardly and then falls thru an unobstructed air space onto the next succeeding pair of agitators, and so on throughout the series. In passing thru the series of agitators, the grain is overturned and scattered by falling thru the air spaces, and at the same time it is subjected to the action of warm air, either dry or moist, passing upwardly through said annular space and the falling grain. The agitators $A^1$ and $B^1$, as shown, are substantially frusto-conical in form and secured in the annular space between the two cylinders with their concave surfaces facing, so that the upper one is inclined outwardly and downwardly while the lower one is inclined inwardly and downwardly, and slightly separated from the lower edge of the upper member to permit the passage of grain therebetween. The lower inverted member $A^1$ is somewhat larger than the upper member $B^1$, so as to overlap the edge thereof and discharge the falling grain near but without touching the inner cylinder, where the heat is most intense, and cause it to fall onto the upper member of the next succeeding pair of agitators. The member $A^1$ may be soldered or otherwise secured to the inner side of the cylinder A, and is of sufficient width to extend inwardly past the lower edge of the member $B^1$ to a point near the outer surface of the inner cylinder, while the inner be conveyed direct to the grinders or into a suitable receptacle. During the downward passage of the grain thru the annular space between the two cylinders, it may be treated with hot air, either moist or dry. To moisten the air, the boiler being supplied with water and the lamp lighted, the heated air passing upwardly through the boiler flues will generate steam which will escape thru the orifices in the discharge pipe *i* and moisten the air as it passes up through the falling grain and thus temper or condition the grain as desired previous to grinding. Beside each pair of agitating devices openings *b* are formed in the inner cylinder through which the heated air, either moist or dry, is caused to pass into the annular space between the two cylinders and up thru the grain as it passes from one inclined surface to another.

It will be observed that the apparatus is automatic in its operation, requiring little or no attention, except to supply the fuel and water necessary to combine in one machine means for heating and moistening the grain, and that when the mill is stopped the wheat is not in contact with the lamp or steam in such a way as to injure it, because it is thrown toward and kept near or against the inner side of the outer cylinder, which is ordinarily comparatively cool, and is perfectly ventilated by providing openings at the base of the cylinder and below the discharge spout, or the upper end of the lamp, as shown, thru which air may enter and escape thru the four flues at the top, so that in no case is the wheat or other grain under treatment subjected to excessive heat. If desired, the device may be used as a cooler for meal, by substituting cold air for hot air.

Ordinarily four agitators are sufficient to accomplish the desired result, but in extreme cases a greater number may be used, for instance, when it is desired to dry the grain, in which case the cylinders may be made longer and a sufficient number of agitators may be used to affect the desired degree of dryness of the grain, or to heat it to the extent desired, which is especially desirable in damp weather, or in winter time. The receiving cone or hopper may rest on supporting means secured on the inner side of the outer cylinder, as shown, or on the top agitator.
It will be understood of course that various changes may be made within the scope of the appended claims without departing from the spirit and scope of my invention, and I therefore do not desire to be limited to the specific construction and arrangement of parts as described and shown.

Having thus described my invention, what I claim as new and desire to secure by Letters Patent of the United States is:
1. A conditioning apparatus comprising outer and inner cylinders spaced apart and having a series of agitating devices therebetween, means for receiving and discharging grain upon said agitators, a boiler within the inner cylinder and means for discharging steam therefrom for moistening air which is caused to pass through the grain at or near the upper end of the cylinder, a heater within the outer cylinder below said boiler, and means for conducting the conditioned grain to a grinder or receptacle therefor.

2. A conditioning apparatus comprising outer and inner cylinders spaced apart and having a series of agitating devices therebetween, a boiler within the inner cylinder and means for discharging steam therefrom for moistening air which is caused to pass through the grain at or near the upper end of the cylinder, a heater within the outer cylinder below said boiler, and a water tank mounted on the outer cylinder in communication with said boiler, together with means including a valve-controlled pipe for supplying water to the boiler.

3. A wheat or grain conditioner comprising two casings arranged one within the other and separated sufficiently to provide an annular space between the two casings, a series of agitating devices within said annular space, a boiler within the inner casing in communication with a water reservoir on the outer side of said outer casing through a valve-controlled pipe for supplying water to said boiler, an air heater below said boiler, a grain receptacle and means at the upper end of the outer casing for distributing the grain upon all sides of the casing, for downward passage through the series of agitators in said annular space, and means below the lowermost agitator whereby the conditioned grain is commingled and an even discharge thereof effected into a common discharge spout.

4. An apparatus for conditioning wheat or other grain comprising a cylindrical casing, a second and shorter cylindrical casing within and spaced from the outer casing, said outer casing projecting above the inner casing so as to provide an open air space above said inner casing and having a grain receptacle thereon provided with air flues through which the grain enters and falls through said open space, a series of agitating devices within the annular space between the two casings comprising upper and lower ring-shaped members of frusto-conical form, one member being inclined outwardly and downwardly toward, and having its lower edge near the other member and the latter being similarly inclined in the reverse direction, means for heating air within the outer cylinder, and means for introducing steam to moisten the heated air.

5. An apparatus for conditioning wheat or other grain comprising a cylindrical casing, a second and shorter cylindrical casing within and spaced from the outer casing, so as to provide an annular space between the two casings, a series of agitating devices in said annular space comprising upper and lower ring-shaped members, the lower member being inclined inwardly and the upper member inclined outwardly and terminating near the upper edge of the lower member, a heater within the lower end of the outer casing, a boiler within the inner casing, means for discharging steam at or near the upper end of the inner casing and a tank on the outer side of the outer casing in communication with said boiler through a valve-controlled pipe for supplying water to the boiler.

6. An apparatus for conditioning wheat or other grain comprising inner and outer cylinders, the inner cylinder being shorter and spaced from the outer cylinder so as to provide an annular space between the cylinders, a series of agitating devices encircling the inner cylinder within said annular space, said devices being of frusto-conical form and arranged in pairs one above the other, the upper member being inclined outwardly and terminating near the upper edge of the lower member, means within the outer cylinder for heating the air therein, a boiler within the inner cylinder arranged over said heating means, and means for conducting steam from said boiler for moistening the air as it passes through the grain at or near the upper end of the cylinder.

7. An apparatus for conditioning wheat or other grain comprising an outer cylindrical casing, an inner casing shorter than and concentric with said outer casing, a series of agitating devices encircling the inner casing within the annular space between the two casings, a grain receptacle mounted on said outer casing and provided with an outwardly and downwardly sloping bottom, and marginal air flues having openings therein through which the grain flows and falls through a subjacent open space onto the uppermost agitator in said series, and means for heating the air within the outer cylinder, together with means for moistening the air which passes through the grain at or near the upper end of the cylinder.

8. In a conditioning apparatus having means at the top thereof for creating descending currents of grain through ascending air and distributing the grain in equal proportions on four sides into an open space below said distributing means, means for heating and conducting heated air through the apparatus in contact with a descending current of grain, means near the top of the apparatus for moistening the heated air ascending through said open space and through descending currents of grain, means for agitating the grain as it descends through the apparatus, and means for commingling and effecting an even or uniform discharge of the conditioned grain in a plurality of approximately equal proportions into a common discharge spout.

9. In an apparatus of the character described, means for creating an ascending column of heated air passing through a descending column of grain, means for agitating the grain at intervals between the inlet end of the apparatus and the point of discharge therefrom, means at the said inlet end for introducing grain through ascending currents of air at several equi-distant points for maintaining said descending column, and means for commingling the conditioned grain and effecting an even discharge thereof into a common discharge spout, the latter means comprising a series of equi-distant spouts at the foot of the descending column converging to a common discharge spout.

10. An apparatus for conditioning wheat or other grain, comprising an outer cylinder, a second and shorter cylinder concentric with said outer cylinder and spaced therefrom, agitating devices arranged at intervals within the annular space between the two cylinders, means for heating and moistening the air and passing it through the grain, a hopper mounted upon the outer cylinder having a substantially conical bottom and marginal air flues having openings therein through which the grain enters on four sides in substantially equal proportions, and converging spouts at the bottom of the inner cylinder for commingling the conditioned grain and effecting an even discharge thereof into a common discharge spout.

11. An apparatus for conditioning wheat or other grain, comprising an outer cylinder, a shorter cylinder within and concentric with said outer cylinder and spaced therefrom, agitating devices in the space between the two cylinders, said outer casing having a cylindrical cover and grain receptacle mounted thereon and provided with a cone-shaped bottom and marginal air flues having openings therein through which the grain flows and falls onto the uppermost agitating device through an ascending column of air, means for heating the air which enters the inner cylinder and conducting it into the space between the two cylinders, means for moistening the heated air and passing it through the grain at or near the upper end of the apparatus, and converging spouts below said agitating devices for commingling the conditioned grain and effecting an even discharge thereof into a common discharge spout.

12. In an apparatus of the character described, including an annular grain passage and means therein for agitating the grain passing therethrough, together with means for treating the agitated grain with heated air, either moist or dry, means at the upper end of said passage for inducing descending currents of grain through ascending currents of air on four sides of said passage, and converging spouts at the lower end of said passage for commingling the outgoing grain and effecting an even discharge thereof from four sides of said passage in approximately equal portions into a common discharge spout.

In testimony whereof I affix my signature in the presence of two witnesses.

THOMAS LAWRENCE TOOMEY.

Witnesses:
WALTER W. RICE,
LUKE BAKER.

Feb. 20, 1923.
H. E. TOWER
1,445,807
PIANO PLAYING PNEUMATIC ACTION
Filed June 27, 1921
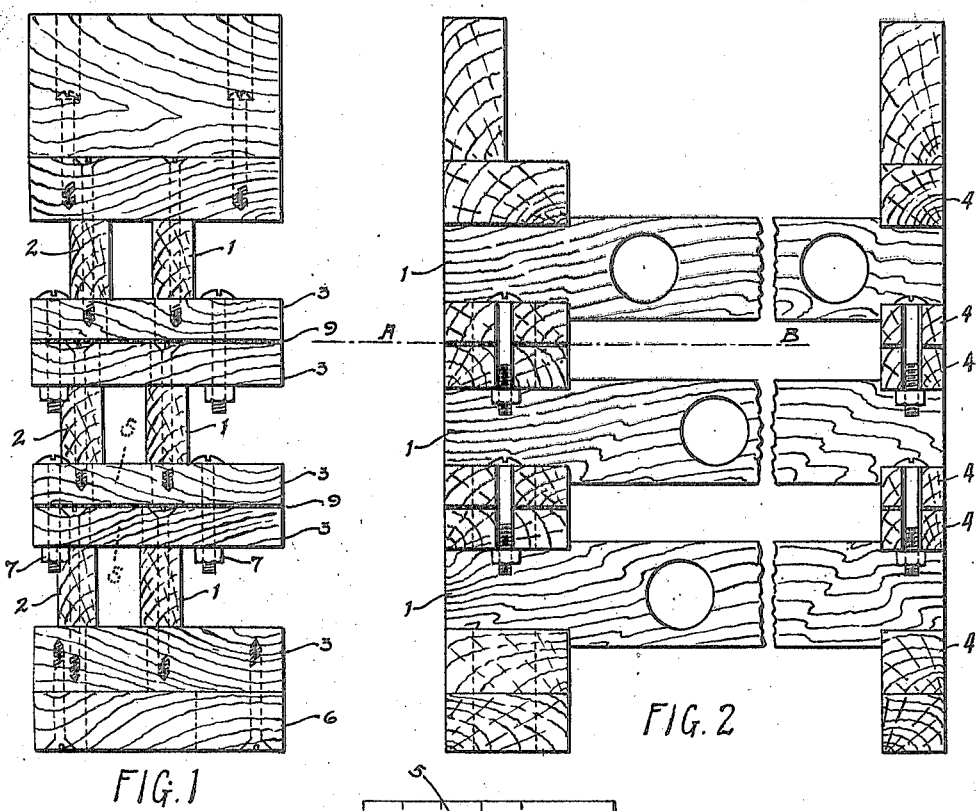
FIG. 1
FIG. 2
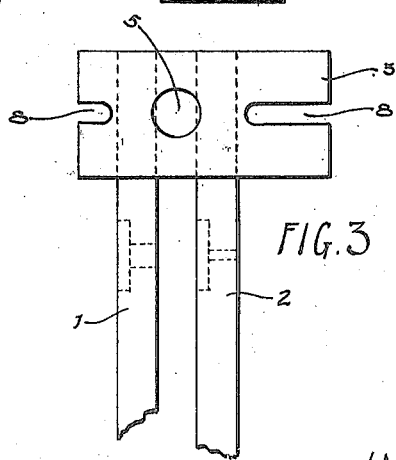
FIG. 3
WITNESSES:
INVENTOR:
Herschel E. Tower.